Feb. 7, 1939.  E. O. SCHJOLIN  2,146,030
HYDRAULIC TRANSMISSION CONTROL
Filed June 19, 1937  3 Sheets-Sheet 1
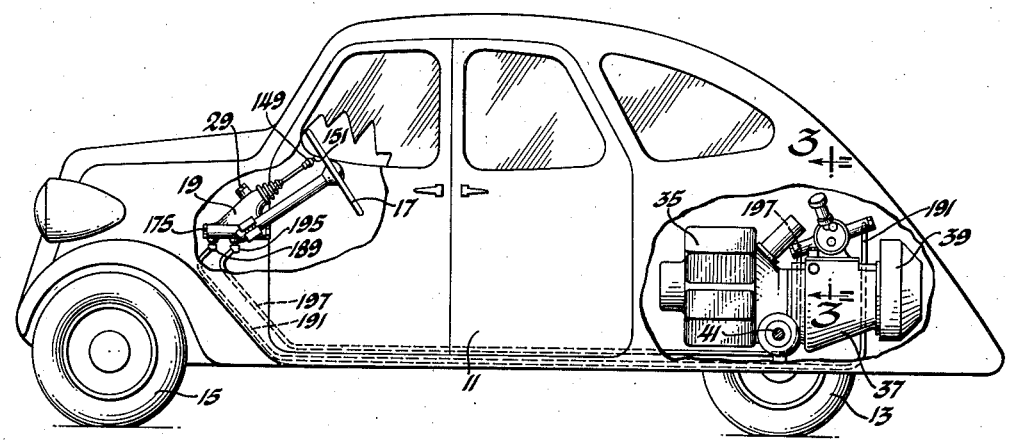
Fig. 1
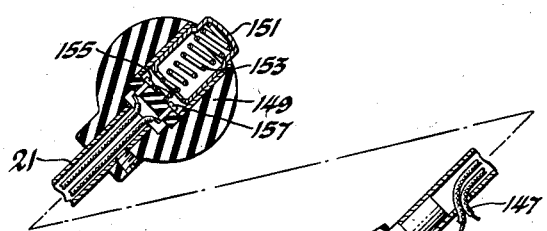
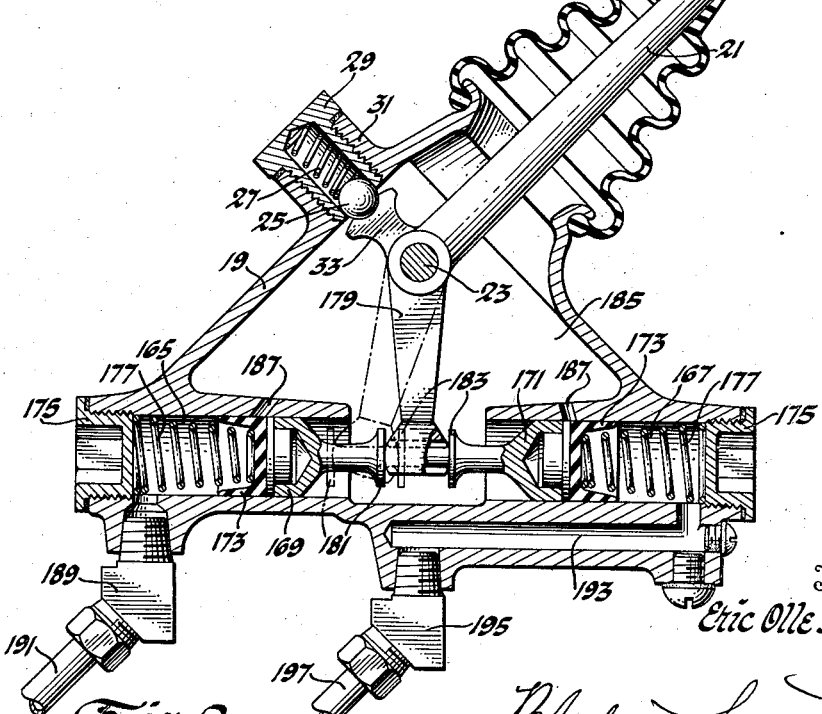
Fig. 2
Inventor
Eric Olle Schjolin
By Blackmore, Spencer & Flint
Attorneys

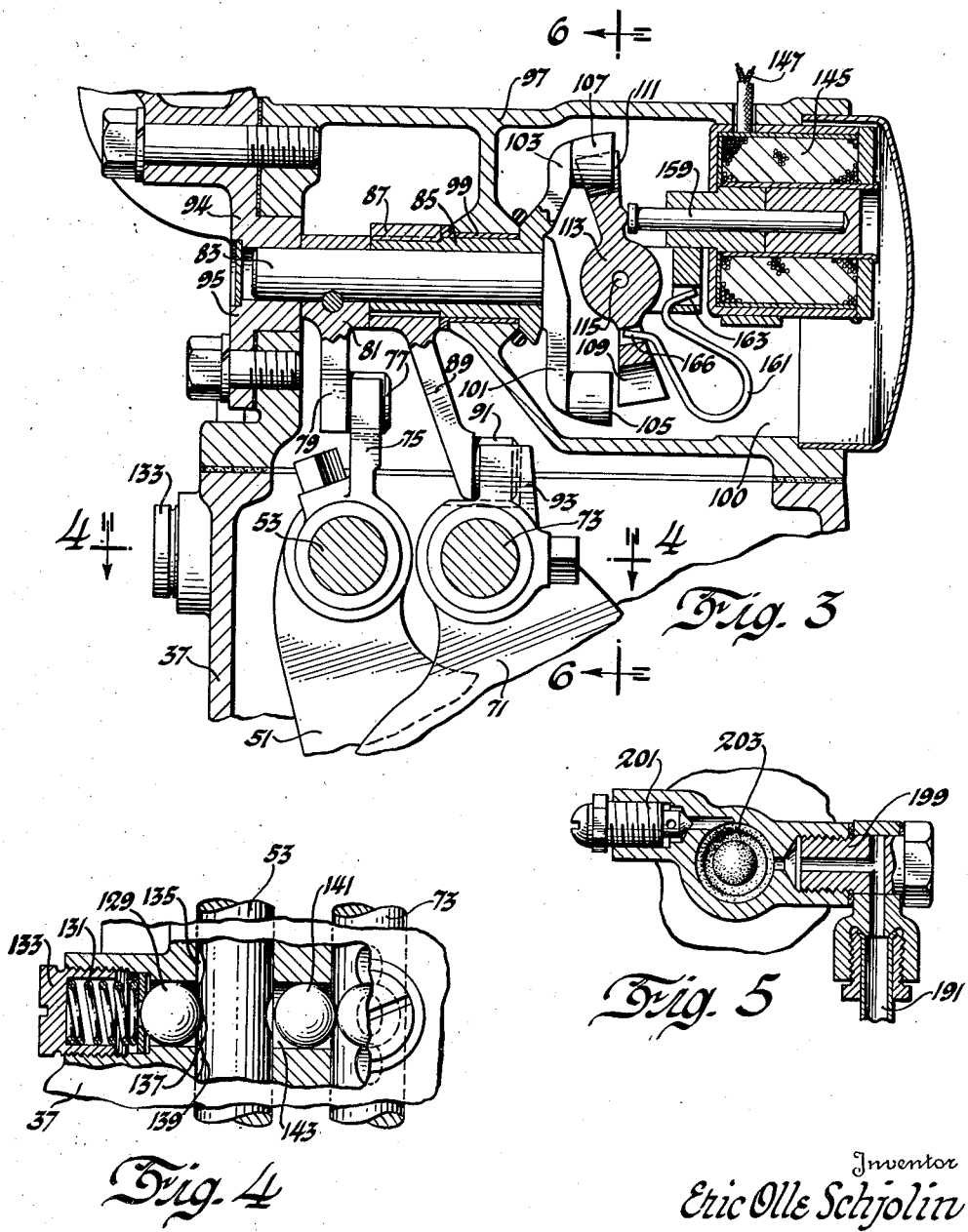

Feb. 7, 1939.  E. O. SCHJOLIN  2,146,030

HYDRAULIC TRANSMISSION CONTROL

Filed June 19, 1937  3 Sheets-Sheet 3

Inventor

Eric Olle Schjolin

By Blackmore, Spencer & Hurd
Attorneys

Patented Feb. 7, 1939

2,146,030

UNITED STATES PATENT OFFICE 2,146,030

HYDRAULIC TRANSMISSION CONTROL

Eric Olle Schjolin, Pontiac, Mich., assignor to General Motors Corporation, Detroit, Mich., a corporation of Delaware Application June 19, 1937, Serial No. 149,179

1 Claim. (Cl. 74—346)

This invention relates to a control for change speed mechanism and has been designed more particularly for those motor vehicle installations where the change speed mechanism is located at some considerable distance from the operator's compartment.

An object of the invention is to provide a simplified form of device for making the several ratio changes by the use of a single lever.

A further object is to provide for ratio changes by mechanism utilizing a movable column of fluid for shifting the conventional rails and gears and an electro-magnet for selecting the rail to be shifted, the switch for so selecting the rail being preferably associated with the lever.

Other objects and advantages will be understood from the following description.

In the drawings accompanying the description,

Figure 1 is a view in side elevation of a motor vehicle, the view being broken away to illustrate the invention. This view is from the left side of the vehicle facing toward the front.

Figure 2 is a transverse section on a longitudinal plane through that part of the mechanism carrying the operating lever.

Figure 3 is a section on line 3—3 of Figure 1.

Figure 4 is a section on line 4—4 of Figure 3.

Figure 5 is a section on line 5—5 of Figure 6, and

Figure 6:
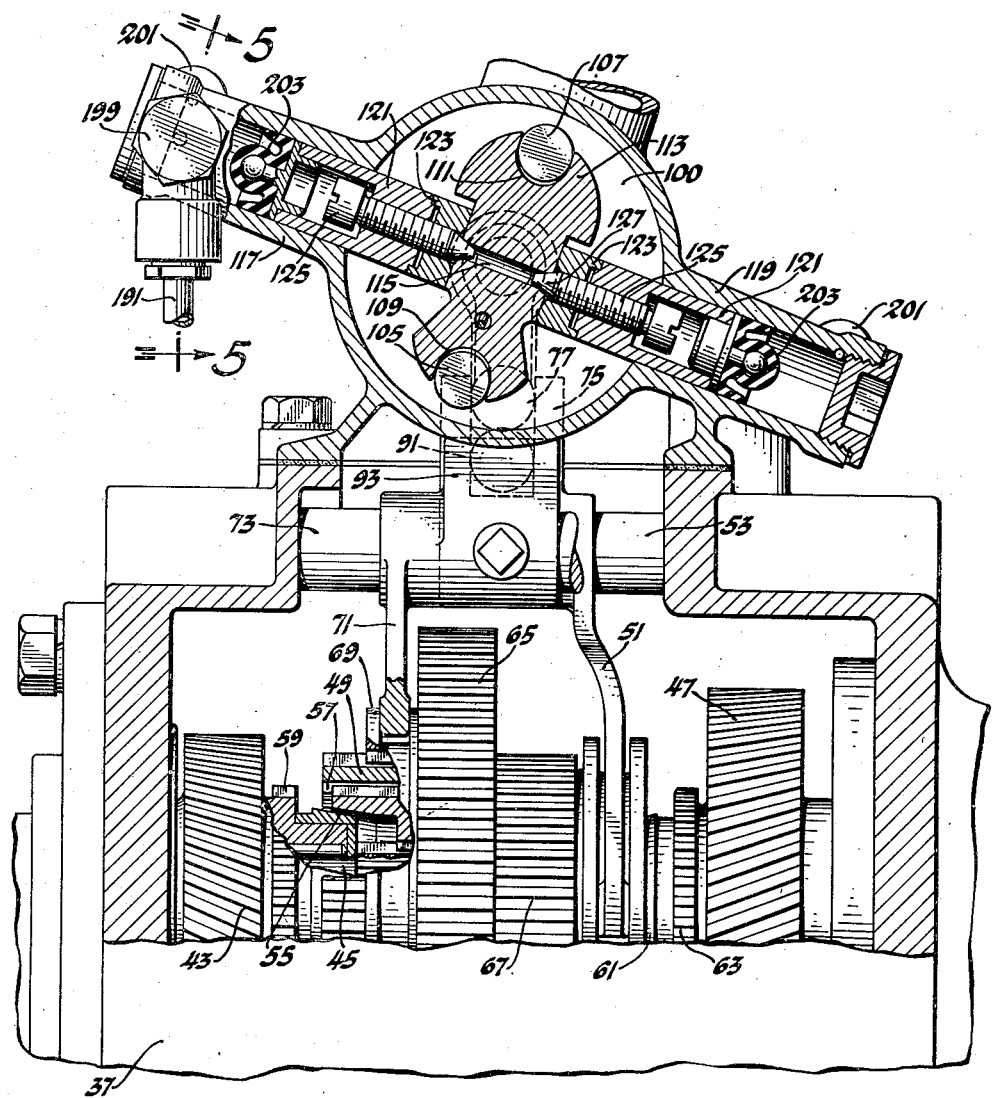
Figure 6 is a section on line 6—6 of Figure 3, this view being seen from the right side of the vehicle.

Referring to the drawings, numeral 11 represents the motor vehicle as a whole mounted on rear wheels 13 and front wheels 15. In the driver's compartment there will be seen a hand wheel 17 for the purpose of steering. Suitably mounted adjacent the steering column is a housing 19 within which a lever 21 is pivoted on a horizontal axis 23. The upper end of the lever extends to a position near the steering wheel. The lever has forward and rearward movements and may be yieldingly held in a mid position by a detent. The detent comprises a ball 25 pressed by a spring 27 carried in a cap 29 threaded in a boss 31 of the housing. The spring pressed ball engages a notch in an arm 33 formed as a part of lever 21. The forward and rearward movements of the lever 21 function to shift forwardly and rearwardly one or the other of the shift rails of the change speed transmission as will be explained.

For the reason that the invention is more particularly useful in those vehicles where the change speed mechanism is quite far removed from the driver's compartment, it is being shown on the drawings as applied to a motor vehicle having its power plant located over the rear axle. The specific details of the power plant are not important but for the purpose of illustration there is shown an engine 35, a transmission change speed gearing 37 and a clutch housing 39 arranged in series above the rear axle 41. The engine shaft is not shown but it extends through the change speed box 37 and into clutch housing 39. The shaft driven by the clutch is not shown but it extends forwardly and into housing 37 where it is provided with gear 43, as shown in Figure 6. The countershaft and its gears are not illustrated in the drawings. They are conventional. The output shaft leading forwardly from the change speed transmission and to a suitable differential mechanism for driving the wheels 13 appears on the drawings and is marked by numeral 45. Within the gear housing this shaft 45 rotatably supports a gear 47. Slidable along the axis of the output shaft is a clutch sleeve 49 adapted to be reciprocated toward gear 43 or gear 47 by fork 51 secured to a reciprocable rail 53. When moved toward gear 43 a synchronizing device 55 of well-known construction first functions in the usual way and then teeth 57 of the sliding clutch member engage teeth 59 rigid with gear 43 and the input shaft to effect a direct drive through the transmission mechanism. When the sliding clutch member 49 is moved toward the gear 47 a similar synchronizing unit 61 first performs its usual function and then clutch teeth, not shown, but carried by the sliding clutch 49 engage clutch teeth 63 formed rigidly with gear 47 whereby gear 47 becomes non-rotatably connected to the driven shaft. It is then driven from gear 43 through the conventional countershaft gears. This gear train effects a second speed drive. Low and reverse ratios are accomplished by a fore and aft reciprocation of a gear 65 slidable on external teeth 67 of the clutch member 49. In one direction the gear 65 is made to mesh with the countershaft gear for low speed and in the other direction of reciprocation it engages with an idler gear, the idler being driven by the countershaft. The drive through the idler effects reverse. Gear 65 has a collar 69 which receives a fork 71 carried by a reciprocable rail 73.

Fork 51 extends above its rail 53 as at 75 and is provided with a recess to receive a rounded extension or pin 77 projecting from an arm 79, the latter extending radially from a hub 81 keyed to a solid shaft 83. Shaft 83 is located within a hollow shaft 85 to which is secured a second hub 87. From hub 87 there extends a radial arm 89 having an axial pin 91 located in the recess of an upper extension 93 of fork 71. Shaft 83 is supported in an end bearing 95 formed in a cover 94 of a top housing 97, this housing being secured in any convenient way on the top of the change speed housing 37. Shaft 85 is rotatably supported within a bearing 99 formed between the ends of the top housing or closure 97. To the right of bearing 99 the housing 97 comprises a compartment 100 within which the shafts 83 and 85 are provided with arms 101 and 103 respectively. Arms 101 and 103 have crankpins 105 and 107 respectively. These pins may be alternately received within recesses 109 and 111 of a crosshead 113. The crosshead is adapted to reciprocate bodily within chamber 100. Provision for its bodily movement will be seen from an inspection of Figure 6. The crosshead is also mounted to rotate about an axis in the plane of Figure 6. The pivotal supporting members extend into the ends of a central opening 115 of the crosshead as will be more particularly explained.

The construction provided for the rotation of the crosshead about its axis is best shown in Figure 6. Diametrically opposite cylinders 117 and 119 extend from compartment 100. Within each cylinder is a piston 121. The pistons project blocks 123 against opposite faces of the crosshead. Threaded screws 125 project through the pistons and blocks and have coned ends 127 extending into the opposite ends of the aperture 115. It is upon these ends that the crosshead rocks so that either the crankpin 105 of shaft 83 or the pin 107 of shaft 85 may engage the crosshead. It will be understood therefore that the above described bodily movement of the crosshead will rock shaft 83 or shaft 85 dependent upon its tilted position. In the position shown by Figure 3 shaft 85 will be rocked by such bodily movement. Such rocking of shaft 85 will rock arm 89 and reciprocate rail 73 to positions for low speed or reverse driving. If, on the other hand, crosshead 113 is tilted so that crankpin 105 is engaged in recess 109 the bodily movement of the crosshead will operate to rock shaft 83 and reciprocate rail 53 and make shifts between high speed and second speed, dependent upon whether the crosshead is moved from its neutral position or to the right or left (Figure 6). It may be explained that the gear box may use any preferred form of spring detent for the rails and also that any suitable device may be used for locking one rail in its neutral position when the other rail is being shifted. This provision is illustrated in Figure 4 where a ball 129 is pressed by a spring 131 located in a cup 133 threaded into the gear box. There are three notches 135, 137, 139 in the rail 53 for engagement with the ball. Notch 137 is for the neutral position of the rail and notches 135 and 139 are for the extreme positions. Just such an expedient is provided for the other rail as is shown by Figure 4. Between the rails there is a ball 141 located in a housing recess 143 and between notches situated at the neutral position of each rail. If either rail is moved from its neutral position it pushes the ball 143 into the notch of the other rail and thereby locks that rail to the housing.

The means for rocking the crosshead about the coned ends of the screws 125 includes a solenoid 145 assembled within the chamber 100. This solenoid is adapted to be energized by an electric circuit which includes wires 147, a suitable source of electrical energy, not shown, and a manually operable switch which may, as shown, be located within the upper end of the hand lever 21.

Figure 2 shows an insulating knob 149 at the upper end of lever 21 through which knob may be projected a circuit closing member 151 normally held outwardly by a spring 153.

Inward movement of 151 against the resistance of the spring causes the member 151 to close the circuit through terminals 155 and 157. When the current is so closed by the switch the solenoid 145 projects a plunger 159 against the crosshead 113 moving the latter to the position shown by Figure 3. During this operation a U-shaped spring 161 is compressed. This spring 161 has a fixed anchor 163 and is engaged with the crosshead at 166. When the circuit is opened the spring 161 is available to rotate the crosshead to its opposite position in which the parts 105 and 109 are engaged. It will be understood from the drawings that this rotation of the crosshead to release one shaft and engage the other by means of the spring and the solenoid can take place only when the pins 105 and 107 are diametrically opposite. Such diametrically opposite arrangement occurs only when the rails 53 and 73 are in their neutral positions, the position shown by Figure 4. It will be seen therefore that the rotation of the crosshead from a position for operating one rail to a position for operating the other rail can be made only when both rails are in their neutral positions.

The provision for bodily movement of the crosshead for obtaining the several driving ratios will now be explained.

Referring to Figure 2, the housing 19 is constructed with two co-axial cylinders 165 and 167. Within these cylinders are connected pistons 169 and 171 each provided with a suitable seal 173. Each cylinder has a closure cap 175 and within each cylinder a spring 177 is seated against the cap and engages the piston seal. Lever 21 has a lower integral arm 179 engaging between abutments 181 and 183 on the rod connecting the two pistons. The cylinders correspond to master cylinders of the hydraulic brake system. The space 185 above the cylinders serves as a reservoir and the communication between each cylinder and the reservoir is provided by means of an opening 187. A fitting 189 connects cylinder 165 to a conduit 191. Cylinder 167 communicates by means of a passage 193 and a fitting 195 with a pipe 197. Conduit 191 extends to the rear end of the vehicle and is there connected by a suitable fitting 199 to the cylinder 117. Similarly, conduit 197 extends to the cylinder 119. Each of these cylinders is provided with a conventional air bleeding expedient such as 201. Within cylinders 117 and 119 the pistons 121 carry flexible seals 203. It will be seen that since both pistons 169 and 171 are moved simultaneously and in the same direction, fluid is transmitted from one and fluid is admitted to the other of the cylinders 117 and 119 with the result that fore and aft movements of lever 21 move pistons 121 together and in the same direction from the mid-position shown by Figure 6 and in so doing the crosshead 113 moves with the result that one or the other of the rails is shifted, the low speed and reverse rail if the solenoid has been actuated by the button 151, the high-speed and second speed rail if the button has been released.

I claim:

In a change speed transmission, a housing, first and second shifting rails reciprocable in said housing, a closure for said housing, said closure formed with a first chamber, co-axial rockshafts in said first chamber, arms on said shafts operably connected to said rails, said closure having a second chamber, a second set of arms on said rockshafts within said second chamber, a crosshead bodily movable in said second chamber, opposed cylinders formed as a part of said closure, pistons in said cylinders, means projecting from said pistons to bodily move and to pivotally support said crosshead, mechanism to rock said crosshead to engage the one or the other of said second arms, a second pair of opposed cylinders having pistons therein, manually operable means to move said second pistons, liquid carrying conduits between said cylinders whereby the crosshead may be reciprocated.

ERIC OLLE SCHJOLIN.